(12) United States Patent
Oohashi et al.

(10) Patent No.: US 8,915,067 B2
(45) Date of Patent: Dec. 23, 2014

(54) DIESEL ENGINE

(75) Inventors: Hiroshi Oohashi, Osaka (JP); Tomohiro Fukuda, Osaka (JP); Taichi Togashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 284 days.

(21) Appl. No.: 13/498,276

(22) PCT Filed: Oct. 20, 2010

(86) PCT No.: PCT/JP2010/068509
§ 371 (c)(1),
(2), (4) Date: Mar. 26, 2012

(87) PCT Pub. No.: WO2011/049137
PCT Pub. Date: Apr. 28, 2011

(65) Prior Publication Data
US 2012/0180463 A1 Jul. 19, 2012

(30) Foreign Application Priority Data
Oct. 21, 2009 (JP) ................. 2009-242803

(51) Int. Cl.
*F01N 3/035* (2006.01)
*F01N 3/10* (2006.01)
(Continued)

(52) U.S. Cl.
CPC ............... *F01N 9/002* (2013.01); *Y02T 10/44* (2013.01); *F01N 3/103* (2013.01); *F02D 41/029* (2013.01); *F01N 3/0235* (2013.01); *B01D 46/0057* (2013.01); *F01N 3/106* (2013.01); *F01N 13/0097* (2013.01); *Y02T 10/47* (2013.01); *F01N 3/023* (2013.01); *F02D 2200/0812* (2013.01); *B01D 2279/30* (2013.01); *F01N 2560/08* (2013.01); *F01N 2560/06* (2013.01); *B01D 46/42* (2013.01); *F01N 2430/085* (2013.01); *F02D 41/405* (2013.01)
USPC .......................................... 60/295

(58) Field of Classification Search
CPC ..... F02D 41/029; F02D 41/083; F01N 9/002; F01N 3/035; B02D 46/0057; B01D 46/448
USPC ..................................... 60/295, 297
See application file for complete search history.

(56) References Cited

U.S. PATENT DOCUMENTS 7,086,220 B2 * 8/2006 Imai et al. ................ 60/274
7,845,165 B2 12/2010 Satou et al.
(Continued)

FOREIGN PATENT DOCUMENTS

JP 2003-003829 A 1/2003
JP 2003-020933 A 1/2003
(Continued)

OTHER PUBLICATIONS

Notice of Reasons for Refusal in JP 2009-242803, Japanese Patent Office, issued Dec. 15, 2011, 7 pages (with English Translation).
(Continued)

*Primary Examiner* — Kenneth Bomberg
*Assistant Examiner* — Brandon Lee
(74) *Attorney, Agent, or Firm* — Sterne, Kessler, Goldstein & Fox, P.L.L.C.

(57) ABSTRACT

Provided is a diesel engine which can efficiently regenerate a diesel particulate filter. The control for regeneration using an ECU includes a first regeneration by burning particulate matter at slightly more than 300° C. for 20 minutes when the accumulation of particulate matter exceeds a first threshold; a second regeneration by burning particulate matter at approximately 560° C. for 30 minutes by an additional injection to remove particulate matter other than ash when the accumulation of particulate matter exceeds the first threshold for a first predetermined period of time, or every 100 hours; and a third regeneration by burning particulate matter at approximately 600° C. for 15 minutes by an additional injection to remove particulate matter other than ash when the accumulation of particulate matter exceeds a second threshold and an emergency regeneration switch is pushed, or after 50 hours since the second or third regeneration and the emergency regeneration switch is pushed.

1 Claim, 7 Drawing Sheets

(51) Int. Cl.
*F02D 41/02* (2006.01)
*F01N 3/023* (2006.01)
*B01D 46/00* (2006.01)
*F01N 13/00* (2010.01)
*B01D 46/42* (2006.01)
*F02D 41/40* (2006.01)
*F01N 9/00* (2006.01)

(56) References Cited

U.S. PATENT DOCUMENTS

| | | | |
|---|---|---|---|
| 2003/0084658 A1* | 5/2003 | Brown et al. | 60/274 |
| 2009/0235644 A1* | 9/2009 | Wu et al. | 60/285 |
| 2010/0058743 A1 | 3/2010 | Tsukada et al. | |
| 2010/0122522 A1* | 5/2010 | Tsukada et al. | 60/284 |

FOREIGN PATENT DOCUMENTS

| | | |
|---|---|---|
| JP | 2005-113752 A | 4/2005 |
| JP | 2005-256718 A | 9/2005 |
| JP | 2005-282479 A | 10/2005 |
| JP | 2006-070826 A | 3/2006 |
| JP | 2006-097623 A | 4/2006 |
| JP | 2006-233833 | 9/2006 |
| JP | 2007-016684 A | 1/2007 |
| JP | 2007-023883 A | 2/2007 |
| JP | 2007-239522 A | 9/2007 |
| JP | 2008-196394 A | 8/2008 |
| JP | 2009-091915 | 4/2009 |
| JP | 2009-138703 A | 6/2009 |

OTHER PUBLICATIONS

Notice of Reasons for Refusal in JP 2012-173462, Japanese Patent Office, issued Jul. 30, 2013, 8 pages (with English Translation).
Notice of Reasons for Refusal in JP 2012-034584, Japanese Patent Office, issued Jul. 30, 2013, 8 pages (with English Translation).
Notice of Reasons for Refusal in JP 2009-242803, Japanese Patent Office, issued Jun. 5, 2012, 6 pages (with English Translation).
International Search Report for PCT/JP2010/068509, Japanese Patent Office, mailed Feb. 1, 2011, 4 pages.
Office Action mailed Oct. 14, 2014, with English translation for JP 2013-205812, a divisional application based on JP 2012-34584, a divisional application of the priority application JP2009-242803.

* cited by examiner

DIESEL ENGINE

TECHNICAL FIELD

The present invention relates to a diesel engine and more particularly to an exhaust emission control device equipped in a diesel engine.

BACKGROUND ART

Conventionally, exhaust emission control devices with diesel particulate filters (Hereinafter abbreviated as "DPF"), which are provided for collecting particulate matter (Hereinafter abbreviated as "PM") included in the exhaust gas, are equipped in diesel engines. For example, the said DPF is made of ceramics forming a honeycomb structural porous media. PM is collected when exhaust gas passes through the DPF, and as a result, the exhaust gas is defecated.

In the above mentioned diesel engines, PM accumulates inside the DPF on the process of cleaning up exhaust gas by means of the exhaust emission control device. This will induce functional depression of the exhaust emission control device. Moreover, increase of exhaust resistance or the like will cause bad effect on the diesel engine. Because of this, control for regeneration of the DPF is implemented so as to remove PM accumulated in the DPF at regular intervals. The said regeneration of the DPF is implemented when estimated amount of accumulated PM reaches a prescribed threshold value. The amount of accumulated PM is estimated on the basis of a differential pressure between the upstream side and the downstream side of the DPF in the flow direction of exhaust gas (Hereinafter abbreviated as the "differential pressure between before and after the DPF").

However, not only combustible ingredients such as soot which can be oxidatively removed, but also ash derived from fuel addition agent or lubricating oil addition agent or the like is included in PM. Since the said ash cannot be oxidatively removed, progress of accumulation of PM will cause big divergence between the estimated amount of accumulated PM which is estimated from the differential pressure between before and after the DPF and the real amount of accumulated PM. In that case, regeneration of the DPF cannot be appropriately performed.

To solve such problems, an art for regenerating the DPF suitably is disclosed in the Patent Literature 1. In this art, amount of accumulated ash in the DPF is estimated on the basis of an operating time of the diesel engine. And the estimated amount of accumulated PM which is calculated on the basis of the differential pressure between before and after the DPF soon after implementing regeneration of the DPF is considered as an amount of accumulated ash. In this way, amount of accumulated ash with high accuracy is obtained.

However, in the art of the Patent Literature 1, PM is oxidatively removed by means of an additional injection or the like only when the amount of accumulated PM estimated from the differential pressure between before and after the DPF exceeds the prescribed threshold value. That is to say, operation conditions of the diesel engine or the temperature of exhaust gas etc. are not considered. For this reason, it is disadvantageous because regeneration of the DPF cannot be performed efficiently. It is also disadvantageous because of leading to problems such as dilution of lubricating oil caused by an increase in frequency of regeneration by the additional injection, or bad fuel consumption.

PRIOR ART DOCUMENTS

Patent Literature

Patent Literature 1: the Japanese Patent Laid Open Gazette 2007-16684

DISCLOSURE OF INVENTION

Problems to be Solved by the Invention

The purpose of the present invention is to provide a diesel engine which can efficiently regenerate a diesel particulate filter in accordance with the state of an operation and to prevent lubricating oil from being diluted.

Means for Solving the Problems

The above-mentioned problems are solved by the following means.

Briefly stated, a diesel engine of the present invention comprises:
  an oxidation catalyst;
  a diesel particulate filter;
  a means for detecting a differential pressure between an upstream side and a downstream side of the said diesel particulate filter; and
  a control means, wherein an amount of particulate matter accumulated in the said diesel particulate filter is estimated on the basis of the said differential pressure, and wherein regeneration of the said diesel particulate filter is performed on the basis of the said estimated amount.

The control for regeneration of the said diesel particulate filter using the said control means is characterized in including:
  first regeneration which does not use an additional injection, wherein regeneration is performed at active temperature range of the said oxidation catalyst;
  second regeneration which uses the additional injection, wherein particulate matter other than ash which cannot be oxidatively removed is completely burned and removed; and
  third regeneration which is performed in non-working state by manual operation by using the additional injection, wherein particulate matter other than ash which cannot be oxidatively removed is completely burned and removed.

With regard to a diesel engine of the present invention, it is preferable if said first regeneration is performed when the said estimated amount is not less than a first threshold value, and also an engine output is within an operation range where slightly less load is loaded relative to the load of an operation range where self regeneration is performed.

With regard to a diesel engine of the present invention, it is preferable if said second regeneration is performed when the said estimated amount exceeds the first threshold value for a first predetermined period of time, or every a second predetermined period of time, and when the engine output is in an operation range outside an operation range of light load and low rotation speed.

With regard to a diesel engine of the present invention, it is preferable if third regeneration cannot be performed within a third predetermined period of time after the end of said second regeneration or said third regeneration.

With regard to a diesel engine of the present invention, it is preferable if in the case in which the said estimated amount exceeds a second threshold value, an alarm for urging the performance of said third regeneration is issued.

With regard to a diesel engine of the present invention, it is preferable if the engine output is limited in the case in which the said estimated amount exceeds the second threshold value and said third regeneration is not performed within a fourth predetermined period of time.

With regard to a diesel engine of the present invention, it is preferable if regeneration temperature of said second regeneration is slightly lower than regeneration temperature of said third regeneration.

With regard to a diesel engine of the present invention, it is preferable if the said estimated amount stored in the said control means is set to zero soon after performing said second regeneration and said third regeneration.

And it is preferable if an amount of accumulated ash in the said diesel particulate filter is estimated on the basis of the said differential pressure, and the relation between an amount of accumulated particulate matter in the said diesel particulate filter and the said differential pressure stored in the said control means is corrected on the basis of the said amount of ash.

With regard to a diesel engine of the present invention, it is preferable if a suction throttle valve for adjusting an amount of inhaled air is comprised.

And it is preferable if an opening of the said suction throttle valve is firstly controlled to be a prescribed opening so that temperature of exhaust gas becomes equal to an activation temperature of the said oxidation catalyst, and then, the opening is controlled to be another prescribed opening so that temperature of exhaust gas becomes equal to an target temperature of said first regeneration, said second regeneration, or said third regeneration during said first regeneration, said second regeneration, or said third regeneration.

Effect of the Invention

According to the present invention, first regeneration which does not use additional injection and second regeneration which use additional injection can be performed depending on the amount of accumulated particulate matter in the diesel particulate filter. Also, third regeneration can be performed depending on situations such as operation conditions or emergency etc. Thus, frequency of performing second regeneration and third regeneration can be reduced. Accordingly, dilution of lubricating oil caused by the additional injection is prevented and fuel consumption would not become worse.

According to the present invention, first regeneration can be performed efficiently. Accordingly, fuel consumption would not become worse.

According to the present invention, particulate matter accumulated in the diesel particulate filter which could not be removed in first regeneration is completely removed by using the additional injection. As such, runaway combustion, which is caused by excess accumulation of particulate matter in the diesel particulate filter, would not occur. Also, it is able to reduce the error in estimating the PM deposition amount since regeneration by using the additional injection is performed at regular intervals.

According to the present invention, limitless implementation of third regeneration can be prevented. It helps prevent dilution of lubricating oil of the diesel engine caused by the additional injection.

According to the present invention, it is able to urge the operator to perform third operation, and the operator can recognize the urgency easily.

According to the present invention, it is able to urge the operator to perform third operation. And occurrence of runaway combustion is prevented.

According to the present invention, it is able to prevent the oxidation catalyst from being thermally-deteriorated due to too much heat and keep on working and perform regeneration even under any working environment with rapid load change of the engine.

According to the present invention, the amount of remained ash is considered in calculating the amount of particulate matter accumulated in the diesel particulate filter. As such, excess implementation of first regeneration, second regeneration, or third regeneration can be prevented.

According to the present invention, discharge amount of carbon hydride can be reduced.

THE MODE FOR CARRYING OUT THE INVENTION

Next, explanation will be given on a diesel engine 1 which is one embodiment of the present invention with reference to FIGS. 1-3.

Figure 1:
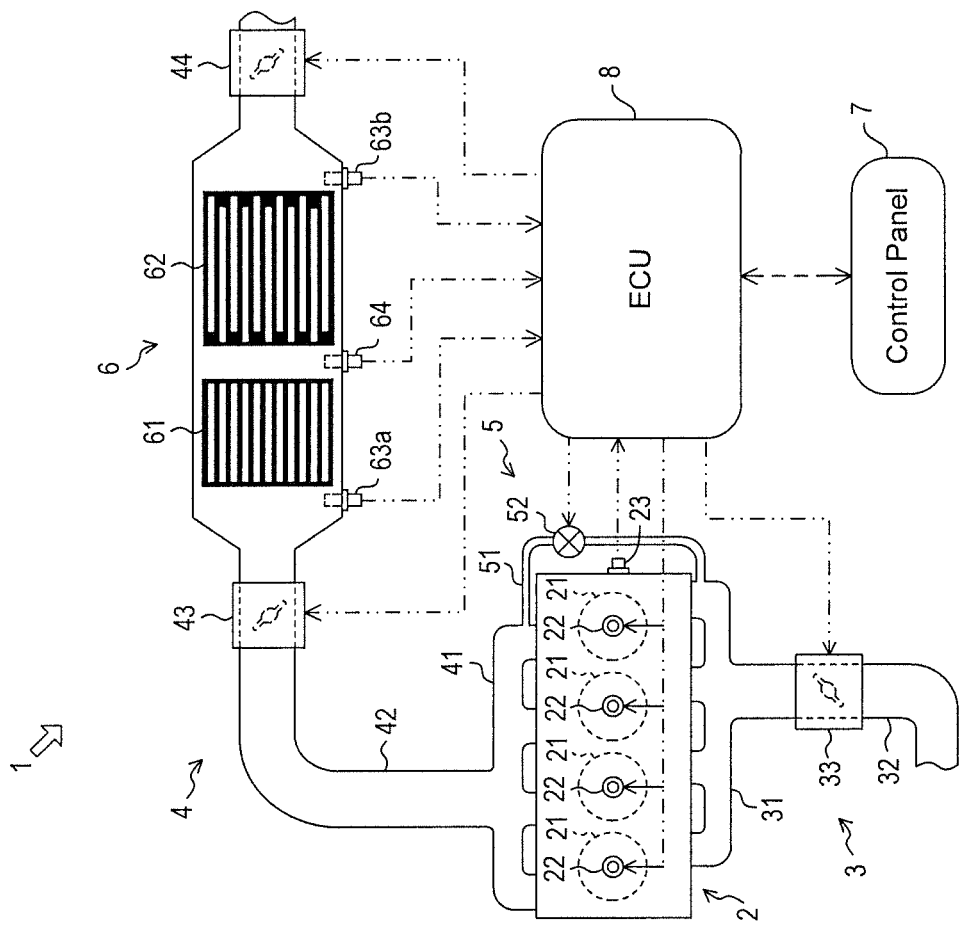
FIG. 1 It is a schematic drawing showing the configuration of a diesel engine according to the present invention.

As shown in FIG. 1, the diesel engine 1 is an inline four-cylinder direct injection diesel engine comprised of a basic engine 2, an air inlet passage 3, an exhaust passage 4, an EGR device 5, an exhaust emission control device 6, a control panel 7, and an ECU 8 etc.

Fuel is supplied to compressed an inside the basic engine 2 so that combustion is implemented. Rotative power can be attained from the expansion energy generated by its combustion. The basic engine 2 is comprised of: a cylinder block including cylindrical cylinders and pistons slidably mounted in the said cylinders; and a cylinder head mounted on the said cylinder block so as to close up opening mouths of the said cylinders. And combustion chambers 21 are formed in the said cylinders between the said pistons and the said cylinder head.

The combustion chambers 21 are spaces which are formed in the said cylinders between the said pistons and the said cylinder head. Fuel is injected into combustion chamber 21 by a fuel injection valve 22 which is provided with the said cylinder head. In this embodiment, four combustion chambers 21 are formed in the basic engine 2.

Four fuel injection valves 22, which is the same in number as combustion chambers 21, are provided with the said cylinder head, and are disposed in each of the combustion chambers 21 respectively so as to inject fuel. The fuel injection valve 22 can perform fuel injection at proper frequency and at proper moment. Engine speed and torque etc. can be changed by altering the state of the said fuel injection.

Also, a rotation sensor 23 is provided with the basic engine 2.

The rotation sensor 23 is provided for measuring the engine speed of the basic engine 2 and is disposed near a crank shaft, a flywheel, or the like of the basic engine 2.

Also, the air inlet passage 3 which constitutes a passage for leading inhaled air into the combustion chambers 21 of the basic engine 2, and the exhaust passage 4 which constitutes a passage for exhaust gas exhausted from the basic engine 2, are connected to the basic engine 2.

The air inlet passage 3 is comprised of an intake manifold 31, an intake pipe 32, and a suction throttle valve 33 etc.

The intake manifold 31 is provided for distributing the inhaled air to each combustion chamber 21 uniformly. The intake manifold 31 is fixed to the said cylinder head. In this embodiment, four combustion chambers 21 are formed in series on the basic engine 2. One end portion of the intake manifold 31 is branched into four pipes. The one end portion of the intake manifold 31 is connected to the basic engine 2, whereby each of the four pipes is communicated with each combustion chamber 21 one-to-one. Meanwhile, the other end portion of the intake manifold 31 is connected to the intake pipe 32.

The intake pipe 32 is a pipe connected to the other end portion of the intake manifold 31. The intake pipe 32 is located on uppermost stream side of the flow direction of inhaled air. That is to say, outer air is inhaled into the intake pipe 32 and defecated by an air cleaner (not shown). After that, inhaled air is supplied to each combustion chamber 21 of the basic engine 2 through the intermediary of the intake manifold 31. The suction throttle valve 33 is provided in the middle portion of the intake pipe 32.

The suction throttle valve 33 is provided for adjusting the amount of inhaled air supplied to the combustion chamber 21 of the basic engine 2 and is provided in the middle portion of the intake pipe 32. For example, a butterfly valve can be applied for the suction throttle valve 33. In that case, the cross-sectional area of the internal space of the intake pipe 32 can be altered by changing the opening of the suction throttle valve 33 by means of DC servomotor or the like; thereby the amount of inhaled air supplied to the combustion chamber 21 can be adjusted.

The exhaust passage 4 is comprised of an exhaust manifold 41, an exhaust pipe 42, an upstream exhaust throttle valve 43, and a downstream exhaust throttle valve 44 etc.

The exhaust manifold 41 is provided for gathering exhaust gas exhausted from the combustion chamber 21 of the basic engine 2. One end portion of the exhaust manifold 41 is branched into four pipes, which means it is formed in the same manner as the intake manifold 31. The one end portion of the exhaust manifold 41 is connected to the basic engine 2, whereby each of the four pipes is communicated with each combustion chamber 21 one-to-one. Meanwhile, the other end portion of the exhaust manifold 41 is connected to the exhaust pipe 42.

The exhaust pipe 42 is a pipe connected to the other end portion of the exhaust manifold 41. The exhaust pipe 42 is located on the most downstream side of the flow direction of exhaust gas. The exhaust emission control device 6 for cleaning exhaust gas is provided in the middle portion of the exhaust pipe 42. The upstream exhaust throttle valve 43 and the downstream exhaust throttle valve 44 is located upstream and downstream of the exhaust emission control device 6 respectively, thereby the exhaust emission control device 6 is sandwiched. That is to say, exhaust gas is exhausted from each combustion chamber 21 of the basic engine 2 to the exhaust pipe 42 through the intermediary of the exhaust manifold 41. After that, exhaust gas is cleaned by the exhaust emission control device 6 and then released outside.

The upstream exhaust throttle valve 43 and the downstream exhaust throttle valve 44 are provided for adjusting the pressure inside the exhaust passage 4 which is due to exhaust gas exhausted from the combustion chamber 21 of the basic engine 2. In the same manner as the suction throttle valve 33, butterfly valves or the like can be applied for these valves. The upstream exhaust throttle valve 43 is located on upstream side in the flow direction of exhaust gas of the exhaust emission control device 6. The downstream exhaust throttle valve 44 is located on downstream side in the flow direction of exhaust gas of the exhaust emission control device 6. The cross-sectional area of the internal space of the exhaust pipe 42 can be altered by changing the opening of the upstream exhaust throttle valve 43 and the downstream exhaust throttle valve 44 by means of DC servomotor or the like; thereby the amount of exhaust gas inhaled into the exhaust emission control device 6 and the amount of exhaust gas exhausted from the exhaust emission control device 6 can be adjusted.

The EGR device 5 is provided for recirculating a portion of exhaust gas passing through the exhaust manifold 41 back to the intake manifold 31 as EGR gas; thereby oxygen concentration of inhaled air supplied to the combustion chamber 21 can be reduced. The EGR device 5 is comprised of an EGR pipe 51 and an EGR valve 52 etc.

The EGR pipe 51 a pipe for communicating the intake manifold 31 and the exhaust manifold 41. The one end of the EGR pipe 51 is communicated to the intake manifold 31. The other end of the EGR pipe 51 is communicated to the exhaust manifold 41.

The EGR valve 52 is provided for adjusting the amount of EGR gas recirculated from the exhaust manifold 41 back to the intake manifold 31 and is located in the middle portion of the EGR pipe 51. The cross-sectional area of the internal space of the EGR passage can be altered by changing the opening of the EGR valve 52 by means of DC servomotor or the like; thereby the amount of EGR gas can be adjusted.

The exhaust emission control device 6 is a device for cleaning exhaust gas by means of removing particulate matter (Hereinafter abbreviated as "PM") included in exhaust gas exhausted from the combustion chamber 21 of the basic engine 2. The exhaust emission control device 6 is provided in the middle of the exhaust pipe 42, and is located between the upstream exhaust throttle valve 43 and the downstream exhaust throttle valve 44. The exhaust emission control device 6 is comprised of an oxidation catalyst 61, a DPF 62, pressure sensors 63a, 63b, and a temperature sensor 64 etc.

Here, PM is particulate substance included in exhaust gas (Particulate Matter: PM). PM is comprised of: combustible ingredients such as soot which can be oxidatively removed; and ash derived from fuel addition agent or lubricating oil addition agent or the like which cannot be oxidatively removed.

The oxidation catalyst 61 is provided for oxidatively removing CO (carbon monoxide), HC (carbon hydride), and SOF (soluble organic fraction) included in exhaust gas exhausted from the combustion chamber 21 of the basic engine 2. Also, the oxidation catalyst 61 oxidizes NO (nitrogen monoxide), which is highly contained in exhaust gas; thereby NO is converted to NO2 (nitrogen dioxide).

The DPF 62 is a diesel particulate filter (Diesel Particulate Filter: DPF) provided for collecting PM so as to filtrate exhaust gas, wherein accumulated PM is oxidatively removed. The DPF 62 is located downstream of the oxidation catalyst 61 in the flow direction of exhaust gas. In this embodiment, the DPF 62 is made from SiC (silicon carbide). The DPF 62 collects PM included in exhaust gas by forcing the exhaust gas to flow through microscopic pores formed in the DPF 62. When the temperature of exhaust gas is high enough to proceed with oxidation reaction, combustible ingredient included in PM collected by the DPF 62 is oxidatively removed by O2 (oxygen) included in exhaust gas or by NO2 (nitrogen dioxide) generated by the oxidation catalyst 61. Meanwhile, ash included in the collected PM is accumulated to the DPF 62 because they cannot be oxidatively removed.

The pressure sensors 63a, 63b are provided for measuring the pressure of exhaust gas exhausted from the basic engine 2, and are respectively located upstream and downstream of the DPF 62 in the flow direction of exhaust gas.

The temperature sensor 64 is provided for measuring the temperature of exhaust gas exhausted from the basic engine 2, and is located between the oxidation catalyst 61 and the DPF 62.

Although, the temperature sensor 64 may be located in either the upstream side of the oxidation catalyst 61 or the downstream side of the DPF 62 in the flow direction of exhaust gas.

The control panel 7 is provided for presenting the current control state (regeneration control state of the DPF 62) of the diesel engine 1. The control panel 7 is also provided for sending prescribed control signal to the ECU 8 by operator's hand. For example, when the diesel engine 1 is mounted on a work vehicle, the control panel 7 may be located near a driver's seat so as to make it visually recognized and manually-operable.

Figure 2:
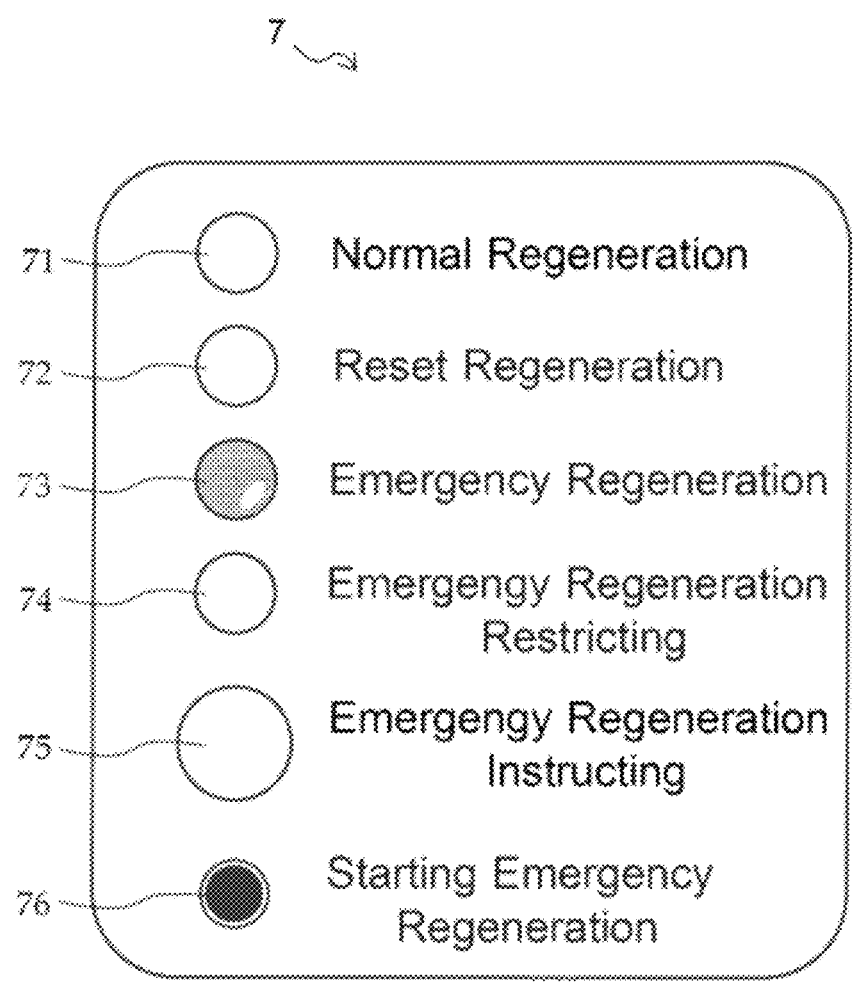
FIG. 2 It is a drawing showing the configuration of a control panel.

As shown in FIG. 2, the control panel 7 comprises a normal regenerating lamp 71, a reset regenerating lamp 72, an emergency regenerating lamp 73, an emergency regeneration restricting lamp 74, and an emergency regeneration instructing lamp 75 which are lighted up depending on regeneration control state of the DPF 62. The control panel 7 also comprises an emergency regeneration starting switch 76 which is provided for sending prescribed control signal to the ECU 8 by operator's hand.

The ECU 8 is an engine control unit (Engine Control Unit: ECU) which behaves as a means for controlling the diesel engine 1. The ECU 8 is comprised of: a central processing unit (CPU) performing a wide variety of arithmetic processing; a read-only memory storing control program and the like; and read/write memory (RAM) temporary storing a wide variety of programs and data etc.

The ECU 8 is electrically-connected to the fuel injection valve 22. Therefore, fuel injection state (timing, frequency, pressure etc.) can be controlled.

The ECU 8 is electrically-connected to the rotation sensor 23. Therefore, the ECU 8 can detect engine rotation speed of the basic engine 2 measured by the rotation sensor 23.

The ECU 8 is electrically-connected to the suction throttle valve 33. Therefore, opening of the suction throttle valve 33 can be controlled.

The ECU 8 is electrically-connected to the upstream exhaust throttle valve 43 and the downstream exhaust throttle valve 44 respectively. Therefore, openings of the upstream exhaust throttle valve 43 and the downstream exhaust throttle valve 44 can be controlled.

The ECU 8 is electrically-connected to the EGR valve 52. Therefore, opening of the EGR valve 52 can be controlled.

The ECU 8 is electrically-connected to the pressure sensors 63a, 63b. Therefore, the ECU 8 can detect pressure of exhaust gas before and after passing the DPF 62 measured by the pressure sensors 63a, 63b.

The ECU 8 is electrically-connected to the temperature sensor 64. Therefore, the ECU 8 can detect temperature of exhaust gas measured by the temperature sensor 64.

The ECU 8 is electrically-connected to the control panel 7. Therefore, prescribed control signal can be sent to the control panel 7. Also, the ECU 8 can receive prescribed control signal sent from the control panel 7.

Control for regeneration of the DPF 62 is performed by the ECU 8 by controlling the above mentioned members which are electrically-connected.

Figure 3:
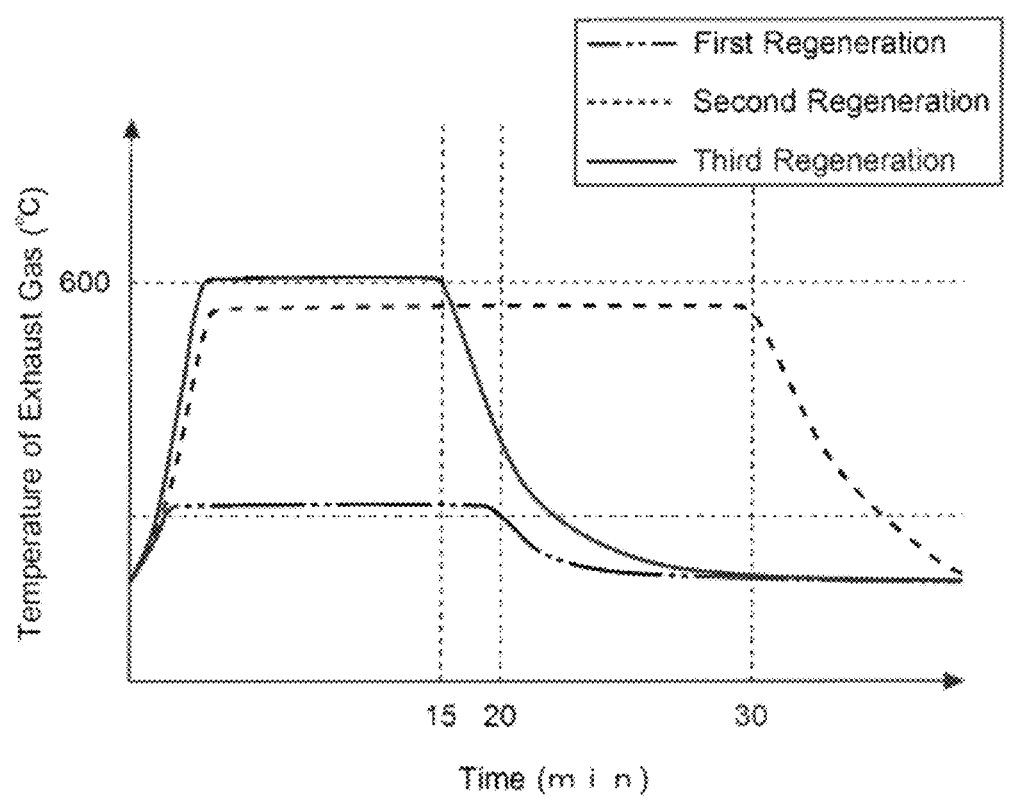
FIG. 3 In is a drawing showing the relation between first regeneration, second regeneration, and third regeneration.

As shown in FIG. 3, the control for regeneration of the DPF 62 using the ECU 8 is comprised of first regeneration, second regeneration, and third regeneration.

In first regeneration, PM accumulated in the DPF 62 is removed by means of burning at active temperature range of the oxidation catalyst 61 for 20 min when the accumulation of PM in the DPF 62 estimated by the ECU 8 [g/l] (Hereinafter abbreviated as "the amount of accumulated PM") exceeds a first threshold value. Here, the "active temperature range" lies higher than the activation temperature of the oxidation catalyst 61 (approximately 200 degree Celsius). Also, the "active temperature range" is low enough to avoid runaway combustion of PM. In this embodiment, the "active temperature range" lies slightly higher than 300 degree Celsius.

In second regeneration, PM accumulated in the DPF 62 is burned at approximately 560 degree Celsius for 30 min by an additional injection to completely remove PM other than ash when the amount of accumulated PM exceeds the first threshold value for a first predetermined period of time, or every second predetermined period of time (100 h).

In third regeneration, PM accumulated in the DPF 62 is burned at approximately 600 degree Celsius for 15 min by an additional injection to completely remove PM other than ash when the amount of accumulated PM exceeds a second threshold value and the emergency regeneration starting switch 76 on the control panel 7 is pushed by the operator, or when a third predetermined period of time (50 h) have elapsed after previous implementation of second regeneration or third regeneration and the emergency regeneration starting switch 76 on the control panel 7 is pushed by the operator.

Here, the "first threshold value" and the "second threshold value" are previously determined by experiments etc. so as to be appropriate values for control for regeneration of the DPF 62 using the ECU 8 respectively. The first threshold value is set slightly smaller than the second threshold value. The second threshold value is low enough to avoid runaway combustion in the DPF 62 by the ECU 8. In other words, the second threshold value is set to be smaller than the limiting value that lead to runaway combustion in the DPF 62, thus high safety margin is ensured.

Also, the "first predetermined period of time", the "second predetermined period of time", and the "third predetermined period of time" are previously determined by experiments etc. so as to be appropriate period of times for control for regeneration of the DPF 62 using the ECU 8 respectively. In this embodiment, the second predetermined period of time is set to be 100 h, and the third predetermined period of time is set to be 50 h.

Hereinafter, detailed explanation will be giver on the control for regeneration of the DPF 62 using the ECU 8 with reference to FIG. 4 to FIG. 7.

Figure 4:
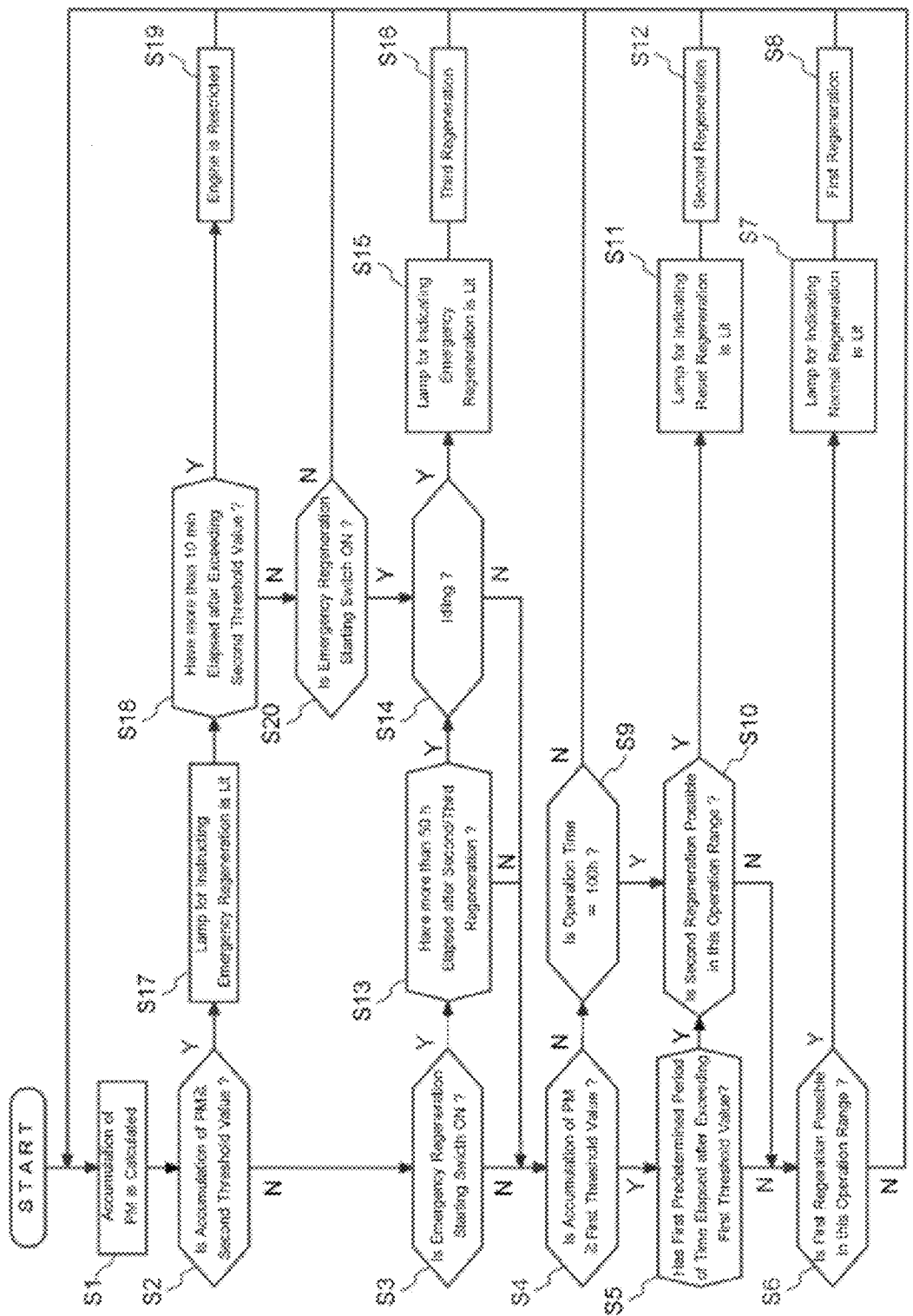
FIG. 4 It is a flow chart showing the control for regeneration.

As shown in FIG. 4, the ECU 8 performs a process comprising step S1 to step S20.

In step S1, the ECU 8 calculates the amount of PM accumulated in the DPF 62 (Hereinafter abbreviated as an "accumulation of PM").

The accumulation of PM is calculated by two methods as described below.

In a first method for calculating the accumulation of PM, the accumulation of PM is estimated on the basis of the differential pressure between the upstream side and the downstream side of the DPF 62 in the flow direction of exhaust gas (Hereinafter abbreviated as the "differential pressure between before and after the DPF 62").

The pressure of exhaust gas before and after passing the DPF 62 are measured by the pressure sensors 63*a*, 63*b* which are located upstream and downstream of the DPF 62. The ECU 8 obtains these measured values from the pressure sensors 63*a*, 63*b* and performs operations, and thus the differential pressure between before and after the DPF 62 is calculated.

Relation between "the differential pressure between before and after the DPF 62" and "the accumulation of PM" is previously determined by experiments etc. and such information is stored in the ECU 8 as a differential pressure map. The ECU 8 calculates the accumulation of PM on the basis of the differential pressure between before and after the DPF 62 which is detected as above. Hereinafter, the accumulation of PM obtained by the first method is defined as "a first accumulation of PM".

In a second method for calculating the accumulation of PM, to begin with, the amount of PM regenerated by the DPF 62 (Hereinafter defined as "PM regeneration amount") is taken away from the amount of PM exhausted from the basic engine 2 (Hereinafter defined as "PM discharge amount"), and then, the value obtained by the said subtraction is integrated. Thus, the said integrated value is estimated as PM deposition amount.

The PM discharge amount and the PM regeneration amount can be obtained on the basis of the engine output of the basic engine 2 respectively.

The ECU 8 obtains the engine speed of the basic engine 2 measured by the rotation sensor 23 provided with the basic engine 2. The ECU 8 also obtains fuel injection amount injected into the combustion chamber 21 by the fuel injection valve 22. With reference to these values and prescribed maps stored in the ECU 8, the ECU 8 detects the engine output of the basic engine 2.

Relation between the "PM discharge amount" and the "engine output of the basic engine 2", and relation between the "PM regeneration amount" and the "engine output of the basic engine 2" are previously determined by experiments etc. and such information is stored in the ECU 8 as maps. The ECU 8 calculates the PM discharge amount and the PM regeneration amount on the basis of the engine output of the basic engine 2 which is detected as above.

The ECU 8 calculates the PM discharge amount and the PM regeneration amount as above every predetermined period of time. That is to say, the PM regeneration amount is taken away from the PM discharge amount. Such value obtained by the said subtraction is regarded as the PM deposition amount accumulated per the predetermined period of time, and the PM deposition amount accumulated per the predetermined period of time is integrated so as to calculate the total PM deposition amount. Hereinafter, the accumulation of PM obtained by the second method is defined as "a second accumulation of PM".

After calculating the first accumulation of PM and the second accumulation of PM, the control step is advanced to step S2 by the ECU 8.

In step S2, the ECU 8 gives a decision whether the PM deposition amount is not less than the second threshold value or not. In more detail, the ECU 8 gives a decision whether the first accumulation of PM is not less than the second threshold value or not, and also gives a decision whether the second accumulation of PM is not less than the second threshold value or not.

If the first accumulation of PM is less than the second threshold value, or if the second accumulation of PM is less than the second threshold value, the control step is advanced to step S3 by the ECU 8.

If the first accumulation of PM is not less than the second threshold value, or if the second accumulation of PM is not less than the second threshold value, the control step is advanced to step S17 by the ECU 8.

In step S3, the ECU 8 gives a decision whether the emergency regeneration starting switch 76 is pressed by the operator or not, stated another way, whether the emergency regeneration starting switch 76 is turned on or not.

When the emergency regeneration starting switch 76 has not been turned on, the control step is advanced to step S4 by the ECU 8.

When the emergency regeneration starting switch 76 has been turned on, the control step is advanced to step S13 by the ECU 8.

In step S4, the ECU 8 gives a decision whether the PM deposition amount is not less than the first threshold value or not. In more detail, the ECU 8 gives a decision whether the first accumulation of PM is not less than the first threshold value or not, and also gives a decision whether the second accumulation of PM is not less than the first threshold value or not.

If the first accumulation of PM is not less than the first threshold value, or if the second accumulation of PM is not less than the first threshold value, the control step is advanced to step S5 by the ECU 8.

If the first accumulation of PM is less than the first threshold value, or if the second accumulation of PM is less than the first threshold value, the control step is advanced to step S9 by the ECU 8.

In step S5, the ECU 8 gives a decision whether the PM deposition amount exceeds the first threshold value for the first predetermined period of time.

If the PM deposition amount does not exceed the first threshold value for the first predetermined period of time, the control step is advanced to step S6 by the ECU 8.

If the PM deposition amount exceeds the first threshold value for the first predetermined period of time, the control step is advanced to step S10 by the ECU 8.

In step S6, the ECU 8 gives a decision whether first regeneration is possible in an operation range at the time, stated another way, whether the engine output of the basic engine 2 is high enough to perform first regeneration.

Figure 5:
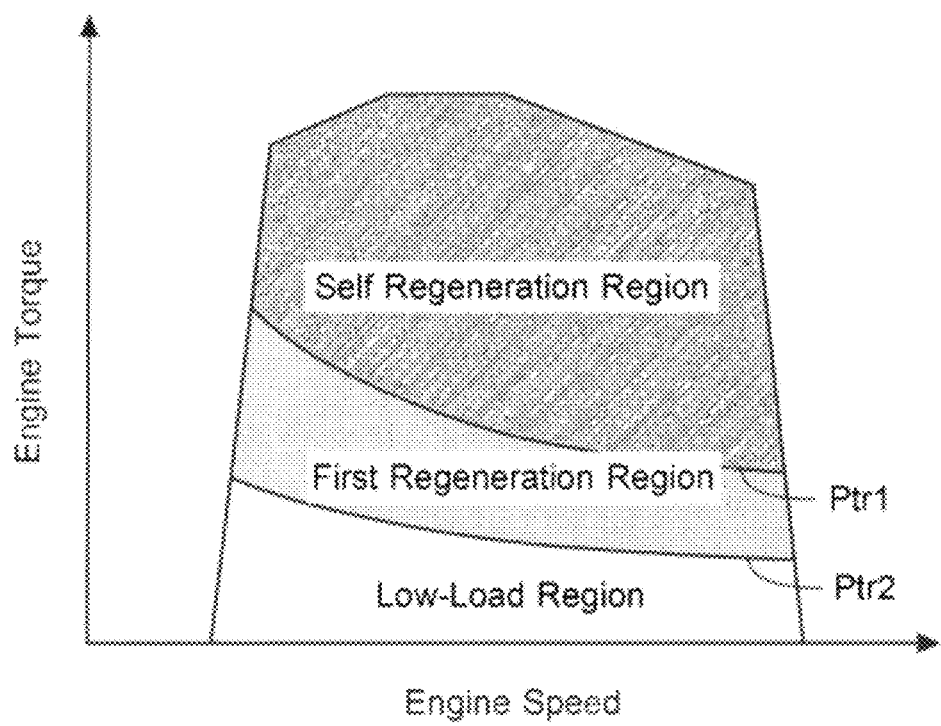
FIG. 5 It is a drawing showing a self regeneration region and a first regeneration region.

As shown in FIG. 5, the operation range of the basic engine 2 is comprised of a "self regeneration region", a "first regeneration region", and a "low-load region" which is the rest region.

In the self regeneration region, the engine output of the basic engine 2 is not less than an output border value Ptr1. In the self regeneration region, the engine load of the basic engine 2 is relatively high, and the temperature of exhaust gas exhausted from the basic engine 2 is high enough to oxidatively remove PM to a satisfactory extent (for example, not less than 350 degree Celsius). Thus, self regeneration is performed.

In the first regeneration region, the engine output of the basic engine 2 is less than the output border value Ptr1 and not less than an output border value Ptr2. In the first regeneration region, the engine load of the basic engine 2 is relatively lower than that of the self regeneration region. As such, self regeneration is not performed. Instead, first regeneration is performed which has equivalent efficacy to self regeneration. In other words, the first regeneration region is an expanded operation range to the self regeneration region.

In the low-load region, the engine output of the basic engine 2 is less than the output border value Ptr2. In the low-load region, the engine load of the basic engine 2 is low, and the temperature of exhaust gas exhausted from the basic engine 2 is so low that it takes a long time to perform regeneration. As such, self regeneration and first regeneration are not performed.

If the engine output of the basic engine 2 at the time is suitable for performing first regeneration, stated another way, if the operation range is within the first regeneration region, the control step is advanced to step S7 by the ECU 8.

If the engine output of the basic engine 2 is in a region outside the first regeneration region, in which first regeneration is not performed, that is, for example if the engine output of the basic engine 2 is in a region inside the self generation region etc, the control step is advanced to step S1 by the ECU 8.

In step S7, the normal regenerating lamp 71 for indicating normal regeneration is lit by the ECU 8. This is for enabling the operator to confirm by sight that normal regeneration, that is, first regeneration is in execution.

After lighting the normal regenerating lamp 71, the control step is advanced to step S8 by the ECU 8.

In step S8, the ECU 8 performs first regeneration.

As mentioned above, PM accumulated in the DPF 62 is burned at 300 degree Celsius for 20 min for removal in first regeneration.

First regeneration is performed only when the engine output of the basic engine 2 is in the range of the first regeneration region. In other words, first regeneration is not performed when the engine output of the basic engine 2 is in the range of the self regeneration region, that is, when the engine output of the basic engine 2 is controlled under high load and the temperature of the exhaust gas is relatively high. Reason for not performing first regeneration in such case is that in the self regeneration region, the temperature of exhaust gas is high enough to perform PM regeneration properly. Also, first regeneration is not performed when the engine output of the basic engine 2 is in the range of the low-load region, that is, when the engine output of the basic engine 2 is controlled under low load and the temperature of the exhaust gas is relatively low. Reason for not performing first regeneration in such case is that in the low-load region, the temperature of exhaust gas is very low compared to the activation temperature of the oxidation catalyst (approximately 200 degree Celsius), and thus, it is hard to perform PM regeneration or it takes too much time to perform PM regeneration.

As such, first regeneration can be performed efficiently. Therefore, fuel consumption would not be bad.

In first regeneration, the temperature of exhaust gas exhausted from the basic engine 2 is raised up to a target temperature (slightly higher than 300 degree Celsius) by means of controlling fuel injection condition of the fuel injection valve 22 (timing, frequency, pressure etc.), the opening of the suction throttle valve 33, the opening of the upstream throttle valve, the opening of the downstream exhaust throttle valve 44, and/or the opening of the EGR valve 52.

In addition, when controlling the opening of the suction throttle valve 33 is applied for the means of raising the temperature of the exhaust gas, it is desirable to control the opening of the suction throttle valve 33 so as to raise the temperature of exhaust gas in a stepwise manner.

Figure 6:
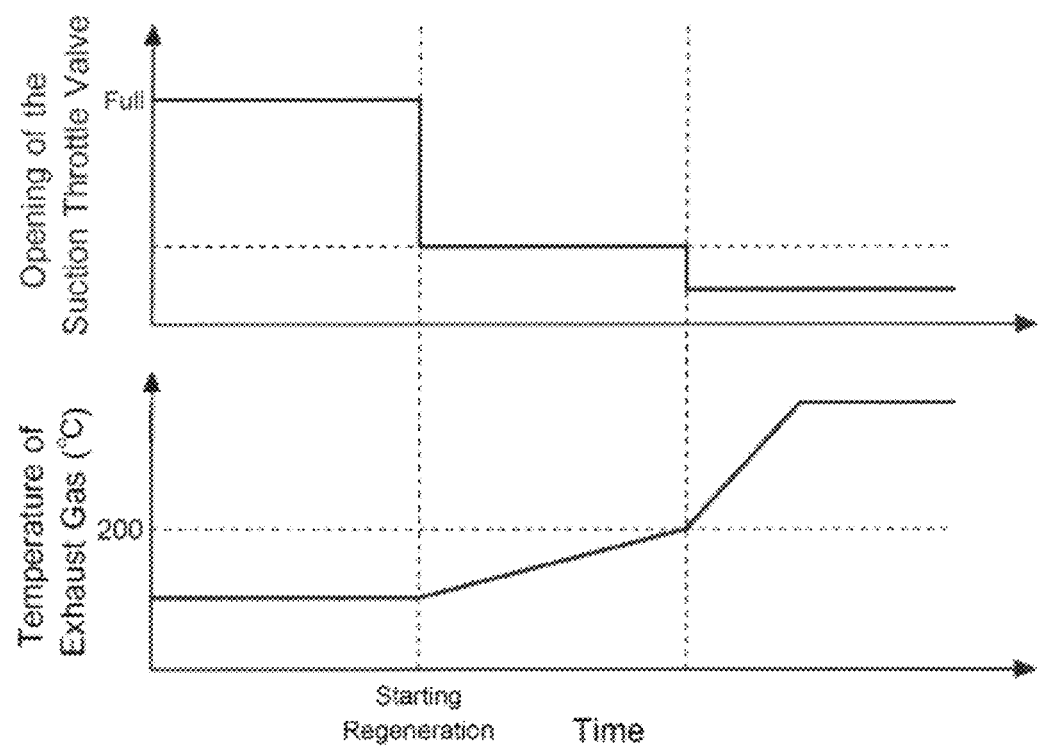
FIG. 6 It is a drawing showing the timing of changing the opening of a suction throttle valve in the case of applying changing of the opening of the suction throttle valve during regeneration.

As shown in FIG. 6, from the regeneration start time until the temperature of the oxidation catalyst 61 reaches the activation temperature (approximately 200 degree Celsius), the opening of the suction throttle valve 33 is controlled to be slightly wider than the eventual opening necessary for raising the temperature of exhaust gas up to the target temperature (slightly higher than 300 degree Celsius) of first regeneration. After the temperature of the oxidation catalyst 61 reaches the activation temperature (approximately 200 degree Celsius), the opening of the suction throttle valve 33 is controlled to be as wide as the eventual opening necessary for raising the temperature of exhaust gas up to the target temperature (slightly higher than 300 degree Celsius). The combustion efficiency of the basic engine 2 becomes low and the amount of carbon hydride included in exhaust gas increases as the opening of the suction throttle valve 33 becomes narrower. The said carbon hydride is oxidized and removed by the oxidation catalyst 61. However, if the temperature of the oxidation catalyst 61 is lower than the activation temperature (approximately 200 degree Celsius), the said carbon hydride is not oxidatively removed. For this reason, the opening of the suction throttle valve 33 is temporarily reduced to reach a requisite opening, which is necessary for raising the temperature of the oxidation catalyst 61 up to the activation temperature (approximately 200 degree Celsius) which is needed for removing the said carbon hydride, instead of reducing at once to reach the eventual opening necessary for raising the temperature of exhaust gas up to the target temperature (slightly higher than 300 degree Celsius).

Accordingly, discharge amount of carbon hydride can be reduced.

After performing first regeneration, the ECU 8 turns off the normal regenerating lamp 71. And the control step is advanced to step S1 by the ECU 8.

In step S9, the ECU 8 gives a decision whether the operating time of the basic engine 2 reaches the second predetermined period of time (100 h) since start up of the engine or since the ending of second regeneration or third regeneration.

When the operating time of the basic engine 2 reaches the second predetermined period of time (100 h) since start up of the engine or since the ending of second regeneration or third regeneration, the control step is advanced to step S10.

When the operating time of the basic engine 2 does not reach the second predetermined period of time (100 h) since start up of the engine or since the ending of second regeneration or third regeneration, the control step is advanced to step S1 by the ECU 8.

Although the second predetermined period of time is set to 100 h in this embodiment, it is not limited to such period of time if it had not been for problems such as low fuel efficiency. Moreover, although the second predetermined period of time in this embodiment is determined on the basis of time, it can be determined on the basis of fuel injection amount of the fuel injection valve 22 into the combustion chamber 22 instead.

In step S10, the ECU 8 gives a decision whether second regeneration is possible in an operation range at the time, stated another way, whether the engine output of the basic engine 2 is high enough to perform second regeneration.

Figure 7:
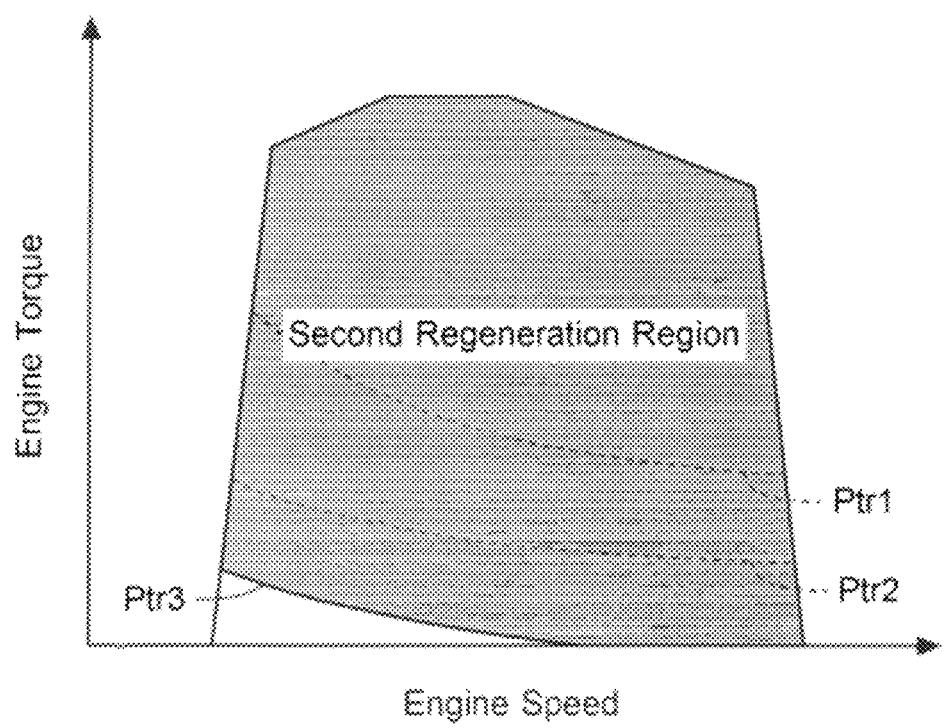
FIG. 7 It is a drawing showing a second regeneration region.

As shown in FIG. 7, the operation range of the basic engine 2 is comprised of the "second regeneration region" and the rest range. Second regeneration cannot be performed in the rest range.

In the second regeneration region, the engine output is not less than an output border value Ptr3. The second regeneration region is wider than the first regeneration region (FIG. 5). In more detail, the second regeneration region is the operation range other than the operation range of low load and low rotation speed. This is because of the following reasons. That is, in the second regeneration region, unlike in the first regeneration region, the temperature of exhaust gas need not be raised up to the temperature necessary for oxidatively removing PM (NOx conversion temperature). Instead, the temperature of exhaust gas needs to be raised up to the temperature necessary for performing the additional injection during second regeneration (the activation temperature of the oxidation catalyst 61). As for this, when the diesel engine 1 is mounted on a work vehicle, the operator can continue his/her work instead of stopping the work vehicle during the second regeneration.

In the operation range at which the engine output is less than the output border value Ptr3, engine load of the basic engine 2 is low and the temperature of exhaust gas exhausted from the basic engine 2 is low. As such, the temperature of the oxidation catalyst 61 does not reach the activation temperature, and it takes too much time to reach the activation temperature. Therefore, second regeneration is not performed.

When second regeneration is possible in the operation range at the time, stated another way, when the engine output of the basic engine 2 is within the second regeneration region, the control step is advanced to step S11 by the ECU 8.

When second regeneration is not performed in the operation range at the time, stated another way, when the engine output of the basic engine 2 is outside the range of the second regeneration, the control step is advanced to step S6 by the ECU 8.

In step S11, the reset regenerating lamp 72 for indicating reset regeneration is lit by the ECU 8. This is for enabling the operator to confirm by sight that reset regeneration, that is, second regeneration is in execution.

After lightning the reset regenerating lamp 72, the control step is advanced to step S12.

In step S12, the ECU 8 performs second regeneration.

As mentioned above, in second regeneration, PM accumulated in the DPF 62 is burned at approximately 560 degree Celsius for 30 min by the additional injection to remove PM.

Second regeneration is performed when the PM deposition amount exceeds the first threshold value for the first predetermined period of time.

Accordingly, PM, which could not be burned and removed sufficiently by first regeneration, accumulated in the DPF 62 is completely burned and removed. As such, runaway combustion, which is caused by excess accumulation of PM in the DPF 62, would not occur.

Also, second regeneration is performed when the operating time of the basic engine 2 reaches the second predetermined period of time (100 h) since start up of the engine or since the ending of second regeneration or third regeneration.

Accordingly, PM accumulated in the DPF 62 is burned and removed sufficiently at regular intervals. As such, it is able to reduce the error in estimating the PM deposition amount.

Third regeneration is performed when the emergency regeneration starting switch 76 is pushed by an operator. In the same way, second regeneration can be performed when a prescribed switch is pushed by an operator.

Also, the PM combustion temperature in second regeneration (approximately 560 degree Celsius) is set to be slightly lower than the PM combustion temperature in third regeneration (approximately 600 degree Celsius).

As for this, though it takes longer time to regenerate compared to second regeneration, it is advantageous because it can prevent the oxidation catalyst 61 from being thermally-deteriorated due to too much heat and keep on working even under any working environment with rapid load change of the basic engine 2.

In second regeneration, firstly, likewise in first regeneration, the temperature of exhaust gas exhausted from the basic engine 2 is raised up to the activation temperature of the oxidation catalyst 61 (approximately 200 degree Celsius) by means of controlling fuel injection condition of the fuel injection valve 22 (timing, frequency, pressure etc.), the opening of the suction throttle valve 33, the opening of the upstream throttle valve, the opening of the downstream exhaust throttle valve 44, and/or the opening of the EGR valve 52. Secondly, the temperature of exhaust gas exhausted from the basic engine 2 is raised up to a target temperature (approximately 560 degree Celsius) by means of the additional injection.

In addition, when controlling the opening of the suction throttle valve 33 is applied for the means of raising the temperature of the exhaust gas, likewise in first regeneration, it is desirable to control the opening of the suction throttle valve 33 so as to raise the temperature of exhaust gas in a stepwise manner.

In second regeneration, PM accumulated in the DPF 62 is burned at approximately 560 degree Celsius for 30 min by the additional injection. As such, PM accumulated in the DPF 62 is considered to have been completely-removed. Accordingly, PM deposition amount stored in the ECU 8 is set to zero.

However, the actual PM deposition amount is not zero because ash which cannot be oxidatively removed is included in PM. Because of this, a map, which shows the relation between the differential pressure between before and after the DPF 62 and the accumulation of ash and is stored in the ECU 8, is referenced. And with reference of this map, the amount of remained ash in the DPF 62 is estimated on the basis of the differential pressure between before and after the DPF 62 which is calculated soon after performing second regeneration. And the differential pressure map, which shows the relation between the differential pressure between before and after the DPF 62 and the PM deposition amount, is updated on the basis of the said estimated amount of ash. The differential pressure map is used for calculating the first accumulation of PM in the step S1.

In this way, the amount of remained ash is considered in calculating the first accumulation of PM. As such, excess operation of first regeneration, second regeneration, or third regeneration can be prevented. Also, the accumulated error in calculating the second accumulation of PM can be reduced.

After performing second regeneration, the reset regenerating lamp 72 is turned off and the emergency regeneration restricting lamp 74 is lit by the ECU 8, the control step is advanced to step S1.

In step S13, the ECU 8 gives a decision whether not less than the third predetermined period of time (50 h) has elapsed after the termination of second regeneration or third regeneration.

Here, the emergency regeneration restricting lamp 74 is turned off by the ECU 8 at the moment when the operating time reaches the third predetermined period of time (50 h) since the termination of second regeneration or third regeneration.

When not less than the third predetermined period of time (50 h) has elapsed after the termination of second regeneration or third regeneration, the control step is advanced to step S14 by the ECU 8.

When less than the third predetermined period of time (50 h) has elapsed after the termination of second regeneration or third regeneration, the control step is advanced to step S4 by the ECU 8.

Although the third predetermined period of time is set to 50 h in this embodiment, it is not limited to such period of time if it had not been for problems such as low fuel efficiency. Moreover, although the third predetermined period of time in this embodiment is determined on the basis of time, it can be determined on the basis of fuel injection amount of the fuel injection valve 22 into the combustion chamber 22 instead.

In step S14, the ECU 8 gives a decision whether the basic engine 2 is in idle state (when the diesel engine 1 is mounted on a work vehicle, whether the work vehicle is in indifferent state).

When the basic engine 2 is in idle state, the control step is advanced to step S15 by the ECU 8.

When the basic engine 2 is not in idle state, the control step is advanced to step S4 by the ECU 8.

In step S15, the emergency regenerating lamp 73 is lit by the ECU 8. This is for enabling the operator to confirm by sight on the control panel 7 that emergency regeneration, that is, third regeneration is in execution.

After lightning the emergency regenerating lamp 73, the control step is advanced to step S16.

In step S16, the ECU 8 performs third regeneration.

As mentioned above, in third regeneration, PM accumulated in the DPF 62 is burned at approximately 600 degree Celsius for 15 min by an additional injection to remove PM.

Third regeneration is performed when the emergency regeneration starting switch 76 on the control panel 7 is pushed while PM deposition amount exceeds the second threshold value. Regeneration of the DPF 62 is hereby performed as emergency regeneration. As such, runaway combustion, which is caused by excess accumulation of PM in the DPF 62, would not occur.

Also, there are times when third regeneration is performed even though PM deposition amount is less than the second threshold value. That is the case only when more than the third predetermined period of time (50 h) has elapsed after previous implementation of second regeneration or third regeneration and the emergency regeneration starting switch 76 on the control panel 7 is pushed.

As for this, limitless implementation of third regeneration can be prevented. Accordingly, it helps prevent dilution of lubricating oil of the basic engine 2 caused by the additional injection.

In third regeneration, firstly, likewise in second regeneration, the temperature of exhaust gas exhausted from the basic engine 2 is raised up to the activation temperature of the oxidation catalyst 61 (approximately 200 degree Celsius) by means of controlling fuel injection condition of the fuel injection valve 22 (timing, frequency, pressure etc.), the opening of the suction throttle valve 33, the opening of the upstream throttle valve, the opening of the downstream exhaust throttle valve 44, and/or the opening of the EGR valve 52. Secondly, the temperature of exhaust gas exhausted from the basic engine 2 is raised up to a target temperature (approximately 560 degree Celsius) by means of the additional injection.

In addition, when controlling the opening of the suction throttle valve 33 is applied for the means of raising the temperature of the exhaust gas, likewise in first regeneration, it is desirable to control the opening of the suction throttle valve 33 so as to raise the temperature of exhaust gas in a stepwise manner.

In third regeneration, PM accumulated in the DPF 62 is burned at approximately 600 degree Celsius for 15 min. As such, likewise in second regeneration, PM accumulated in the DPF 62 is considered to have been completely-removed. Accordingly, the present PM deposition amount stored in the ECU 8 is set to zero. And the pressure map, which shows the relation between the differential pressure between before and after the DPF 62 and the PM deposition amount, is updated on the basis of the PM deposition amount. The said PM deposition amount is estimated on the basis of the differential pressure between before and after the DPF 62 which is calculated soon after performing third regeneration.

In this way, the amount of remained ash is considered in calculating the first accumulation of PM. As such, excess implementation of first regeneration, second regeneration, or third regeneration can be prevented. Also, the accumulated error in calculating the second accumulation of PM can be reduced.

After performing third regeneration, the emergency regenerating lamp 73 and the emergency regeneration instructing lamp 75 is turned off and the emergency regeneration restricting lamp 74 is lit by the ECU 8, and the control step is advanced to step S1.

In step S17, the emergency regeneration instructing lamp 75 is lit by the ECU 8. This is for informing the operator an alarm by sight on the control panel 7. The alarm is for informing the operator that the emergency regeneration starting switch 76 should be pushed.

It may also be configured to beep a warning sound for informing the operator that the emergency regeneration starting switch 76 should be pushed.

After the emergency regeneration instructing lamp 75 is lit by the ECU 8, the control step is advanced to step S18.

In step S18, the ECU 8 gives a decision whether the PM deposition amount exceeds the second threshold value for not less than a fourth predetermined period of time (10 min).

When the PM deposition amount exceeds the second threshold value for not less than the fourth predetermined period of time (10 min), the control step is advanced to step S19.

When the PM deposition amount exceeds the second threshold value for less than the fourth predetermined period of time (10 min), the control step is advanced to step S20.

Here, the "fourth predetermined period of time" is previously determined by experiments etc. so as to be an appropriate value for control for regeneration of the DPF 62 implemented by the ECU 8. In this embodiment, the fourth predetermined period of time is set to 10 min. However, the fourth predetermined period of time is not limited to 10 min if it had not been for problems such as runaway combustion etc. Moreover, although the fourth predetermined period of time in this embodiment is determined on the basis of time, it can be determined on the basis of fuel injection amount of the fuel injection valve 22 into the combustion chamber 22 instead.

In step S19, the engine output of the basic engine 2 is restricted by the ECU 8.

In more detail, the ECU 8 controls the engine speed and torque so as not to be raised up to the normal values.

As for this, if the operator ignores the alert and keep on working, the engine output would not rise and it will become hard to continue working. Accordingly, the operator is obliged to perform regeneration. Thus, the operator is urged to perform third regeneration, that is, to push the emergency regeneration starting switch 76. Moreover, occurrence of runaway combustion caused by high-temperature exhaust gas is prevented when excessive amount of PM is accumulated to the DPF 62 because temperature of exhaust gas would not become excessive. Furthermore, leakage of exhaust gas is prevented even if excessive amount of PM is accumulated to the DPF 62 because the pressure of exhaust gas is reduced.

Also, the minimum engine speed of the basic engine 2 is raised up by the ECU 8.

Thus, occurrence of runaway combustion caused by reduction of exhaust gas is prevented when excessive amount of PM is accumulated to the DPF 62.

In step S20, likewise in step S3, the ECU 8 gives a decision whether the emergency regeneration starting switch 76 is pressed by the operator or not, stated another way, whether the emergency regeneration starting switch 76 is turned on or not.

When the emergency regeneration starting switch 76 has not been turned on, the control step is advanced to step S14 by the ECU 8.

When the emergency regeneration starting switch 76 has been turned on, the control step is advanced to step S1 by the ECU 8.

INDUSTRIAL APPLICABILITY

The present invention is available for a diesel engine including a diesel particulate filter.

Description of Notations

1 diesel engine
2 basic engine
3 air inlet passage
4 exhaust passage
5 EGR device
6 exhaust emission control device
7 control panel
8 ECU
21 combustion chamber
22 fuel injection valve
33 suction throttle valve
43 upstream exhaust throttle valve
44 downstream exhaust throttle valve
52 EGR valve
61 oxidation catalyst
62 DPF

What is claimed is:

1. A diesel engine comprising:
an oxidation catalyst, a diesel particulate filter;
a device which detects a differential pressure between an upstream side and a downstream side of the said diesel particulate filter;
a control device which estimates an amount of particulate matter accumulated in the diesel particulate filter on the basis of the differential pressure, and of which regenerates the diesel particulate filter on the basis of the estimated amount of the particulate matter; and
a control panel having an emergency regeneration restriction lamp, an emergency regeneration instructing lamp and an emergency regeneration starting switch,
wherein the control device performs first regeneration for burning and removing the particulate matter in an active temperature range of the oxidation catalyst without using an additional injection, second regeneration for burning and removing the particulate matter automatically, using the additional injection, and third regeneration for burning and removing the particulate matter manually, using the additional injection,
wherein the first regeneration is performed so as to, after a temperature of the oxidation catalyst reaches an active temperature, increase a temperature of exhaust gas to a target temperature,
wherein the second regeneration is performed at a first prescribed time,
wherein the third regeneration is performed when the emergency regeneration instructing lamp for urging the performance of the third regeneration is lighted up, and the emergency regeneration starting switch is on, or when the emergency regeneration starting switch is on after a lapse of a second prescribed time from previous performance of the second regeneration or the third regeneration,
wherein before a lapse of the second prescribed time from previous performance of the second regeneration or the third regeneration, the emergency regeneration restricting lamp is lighted up without lighting up the emergency regeneration instructing lamp, and the third regeneration cannot be performed, and
wherein the second prescribed time is shorter than the first prescribed time.

* * * * *

UNITED STATES PATENT AND TRADEMARK OFFICE
CERTIFICATE OF CORRECTION

PATENT NO. : 8,915,067 B2  
APPLICATION NO. : 13/498276  
DATED : December 23, 2014  
INVENTOR(S) : Oohashi et al.

Page 1 of 1

It is certified that error appears in the above-identified patent and that said Letters Patent is hereby corrected as shown below:

In the Claims

In column 18, line 5 (Claim 1) please replace "a downstream side of the said diesel" with -- a downstream side of the diesel --

In column 18, line 9 (Claim 1) please replace "pressure, and of which regenerates" with -- pressure, and which regenerates --

Signed and Sealed this
Twenty-fifth Day of August, 2015

Michelle K. Lee
*Director of the United States Patent and Trademark Office*